(12) United States Patent
Candelore (10) Patent No.: US 10,944,544 B2
(45) Date of Patent: Mar. 9, 2021

(54) REDUCING VARIABLE-LENGTH PRE-KEY TO FIX-LENGTH KEY

(71) Applicant: Sony Corporation, Tokyo (JP)

(72) Inventor: Brant Candelore, Escondido, CA (US)

(73) Assignee: Sony Corporation, Tokyo (JP)

( * ) Notice: Subject to any disclaimer, the term of this patent is extended or adjusted under 35 U.S.C. 154(b) by 163 days.

(21) Appl. No.: 16/183,532

(22) Filed: Nov. 7, 2018

(65) Prior Publication Data

US 2020/0145186 A1    May 7, 2020

(51) Int. Cl.
*H04L 9/06* (2006.01)
*H04L 9/14* (2006.01)
*G06F 21/16* (2013.01)

(52) U.S. Cl.
CPC ............ *H04L 9/0618* (2013.01); *G06F 21/16* (2013.01); *H04L 9/0643* (2013.01); *H04L 9/14* (2013.01); *G06F 2221/0753* (2013.01)

(58) Field of Classification Search
CPC ....... H04L 9/0618; H04L 9/0643; H04L 9/14; G06F 21/16
See application file for complete search history.

(56) References Cited

U.S. PATENT DOCUMENTS

| | | | | |
|---|---|---|---|---|
| 5,548,648 | A * | 8/1996 | Yorke-Smith | ......... H04L 9/0869 380/29 |
| 6,560,337 | B1 | 5/2003 | Peyravian et al. | |
| 7,366,302 | B2 * | 4/2008 | Candelore | .......... H04N 21/4334 380/239 |
| 7,970,132 | B2 | 6/2011 | Fahrny et al. | |
| 8,204,220 | B2 | 6/2012 | Candelore | |
| 8,520,846 | B2 | 8/2013 | Karroumi et al. | |
| 9,350,539 | B2 | 5/2016 | Veugen et al. | |
| 9,813,248 | B2 | 11/2017 | Bashyam et al. | |
| 2002/0080958 | A1 * | 6/2002 | Ober | ....................... G06F 21/79 380/44 |
| 2010/0246819 | A1 | 9/2010 | Candelore | |
| 2010/0299313 | A1 * | 11/2010 | Orsini | ..................... H04L 63/20 707/652 |
| 2012/0166818 | A1 * | 6/2012 | Orsini | ................... H04L 9/3231 713/193 |
| 2017/0019376 | A1 | 1/2017 | Hars | |
| 2017/0272244 | A1 * | 9/2017 | Garcia Morchon | ...... H04L 9/14 |

(Continued)

FOREIGN PATENT DOCUMENTS

CN          103490889 B       3/2017

OTHER PUBLICATIONS

U.S. Appl. No. 16/597,677, filed Oct. 9, 2019, Brant L. Candelore.

(Continued)

*Primary Examiner* — Oleg Korsak
(74) *Attorney, Agent, or Firm* — John L. Rogitz (57) ABSTRACT

A method and apparatus for reducing a variable number of pre-key bits to a fix key size is disclosed. The resulting key is used with a symmetric block cipher to descramble content. By being able to directly adapt a large and variable number of bits, it is possible to use cryptographic algorithms that were not thought possible, such as the output of modem public key and hashing functions, in order to create a key to directly use with a symmetric block cipher. Some or all of the pre-key bits may be used in the creation of the key.

19 Claims, 11 Drawing Sheets

(56) References Cited

U.S. PATENT DOCUMENTS

2018/0367309 A1* 12/2018 Reinhold ................ H04L 9/004
2019/0163902 A1*  5/2019 Reid ..................... G06F 9/3851

OTHER PUBLICATIONS

Brant Candelore, "Pre-Key with Authentication Using Logical Combinations of Pre-Key Bits with Other Information", file history of related U.S. Appl. No. 16/597,677, filed Oct. 9, 2019.

* cited by examiner

FIG. 3  Transmitter logic

FIG. 4    Receiver logic

Pre-key is Larger but only selected Bytes Used

- Bytes can be selected from any of the "extra" bytes sent

- Bytes can be applied or EXOR'ed to any of the lower bytes of the prekey

Fields that may be delivered in the encrypted Pre-key message to allow for application of key reduction

FIG. 11

REDUCING VARIABLE-LENGTH PRE-KEY TO FIX-LENGTH KEY

FIELD

This patent application relates to technically inventive, non-routine solutions that are necessarily rooted in computer technology and that produce concrete technical improvements.

BACKGROUND

The subject matter is related to U.S. Pat. No. 7,366,302, and is hereby incorporated by reference in its entirety. With the continued inexorable growth of the World Wide Web, there has been an ever increasing number of video streaming service providers, like Netflix, Amazon Video, Sony Crackle, Sony PlayStation Vue, Vudu, and Hulu, and music service providers, like Pandora, Spotify, Amazon Music and iTunes. Powerful mobile devices, e.g. cell phones and tablets, connected to the World Wide Web, can download applications for these services so that the video and music content can be enjoyed not just on the living room TV or stereo system, but practically anywhere. Terrestrial broadcasters will soon be deploying hybrid systems which will combine over-the-air delivery of content with additional content from the World Wide Web in a system called "ATSC 3.0". And soon, cellular providers will be starting 5G ultra-wideband service nationwide, and we will all be awash in high speed data wireless connectivity allowing for both high resolution and immersive content. The high speed connectivity will no doubt bring new types of services. And while the content providers are continually in search of new distribution schemes and business models to increase their business, they are still very concerned about unauthorized and uncontrolled copying of content.

Digital Right Management (DRM) and copy protections schemes are evolving in response to the service providers' desire to have their content shown everywhere. Not only must the user be authenticated, proving that the user is a paid subscriber, but also the various individual mobile and TV devices owned by that user running the particular service. The devices must prove that they are from a trusted group of devices that will properly secure the content before content, such as 4K, will be delivered to them. Many of these devices have been architected with a dedicated cryptographic processor that securely handles keys. This is called a "secure enclave" and is discussed in more detail later.

Enabling the authorized derivation or decryption of descrambling keys in each of a user's devices is the main objective of any DRM or copy protection scheme. Content is typically scrambled using a standardized block cipher such as the Advanced Encryption Standard (AES). And the descrambling key is usually of fixed size such as 128-bits. U.S. Pat. No. 7,366,302 teaches that the descrambling key can be the result of traversing a key hierarchy and multiple stage decryptions as part of authentication and access control processing. Some of the stages can use legacy block ciphers. If there is a mismatch in size, then U.S. Pat. No. 7,366,302, as shown in FIGS. 15-17, describes set mechanisms for all of the bits output from legacy block ciphers, what we are calling "pre-key" bits, to be systematically used in the generation of the final, reduced bit key used to descramble the content.

Some new methods for authenticating users and devices can use Public Key Infrastructure (PKI) techniques and hashing. A public key algorithm such as RSA or Elliptic Curve may be used. With the RSA algorithm, in a single decryption operation, the payload can be up to the size of the modulus. And so, with a 2048 bit modulus, the payload can be 2048 bits long. When using a public key algorithm in the key hierarchy, the payload is not constrained by the size of legacy block ciphers, e.g. 56-bits for DES or 64-bits for DVB common scrambling algorithm since they are not used. A public key algorithm can be used to deliver a significantly larger number of "pre-key" bits and they can be of variable number. It should also be noted that the public key algorithm can also deliver fewer "pre-key" bits than that for block encryption, and this will be discussed later. Likewise, data can be hashed using various techniques, e.g. using SHA-2 or SHA-3, and can yield a large variable number of "pre-key" bits. For example, both SHA-2 and SHA-3 can create a hash of up to 512 bits in size. It would be desirable to be able to handle the variable amount "pre-key" bits from a public key or hashing algorithm in a systematic way, by using all of the bits to calculate a final key. Likewise, it would be desirable to be able to handle a fewer number than the total number of "pre-key" bits if desired to reduce the amount of processing. And likewise, should the number of "pre-key" bits be smaller than the desired number of bits, have a systematic way to handle that scenario.

SUMMARY

As understood herein, various cryptographic algorithms can create a variable number of "pre-key" bits which must be reduced to a fixed size when used with a standard symmetric block cipher such as AES. By being able to directly adapt a large and variable number of bits, it is possible to use cryptographic algorithms that were not thought possible, such as the output of modern public key and hashing functions, in order to create a key to use with a symmetric block cipher.

When some but not all the bits of the "pre-key" are used, a signaling method may be needed to identify which bits and how they are used. This can add another layer of security and pose an impediment to potential hackers.

Accordingly, an apparatus includes at least one computer storage that is not a transitory signal and that in turn includes instructions executable by at least one processor to receive a first pre-key having a first size. The instructions can be executable to reduce the first size by logical operation using first bits of the first pre-key, but not using second bits of the first pre-key to render a first key for decrypting content. The first key has a second size smaller than the first size. The instructions may be executable to decrypt content using the first key. Furthermore, the instructions can be executable to receive a second pre-key having a third size different from the first size, reduce the third size by a logical operation using first bits of the second pre-key but not using second bits of the second pre-key to render a second key for decrypting content, the second key having a size smaller than the third size, and decrypt content using the second key.

In non-limiting examples, the logical operation may include an exclusive-OR operation. If desired, the instructions can be executable to receive information identifying the first bits, and use the information to execute the logical operation. In example implementations, the instructions can be executable to receive information identifying the first size, and use the information to execute the logical operation.

The apparatus may include the processor. The apparatus may include a secure enclave. The apparatus may include a descrambler and secure memory. The computer storage may be embodied in a television or a set-top box.

In non-limiting implementations, at least one byte of the first pre-key is not used to generate any byte of the first key.

In another aspect, a method includes receiving a first key having a variable size, and reducing the variable size of the first key to a second size less than the variable size to form a reduced key whose value is a function of some but not all bytes of the first key. The method also includes decrypting received content according to the reduced key.

In example embodiments of this aspect, the first key may include first bytes and second bytes, and reducing the variable size may include performing a logical exclusive OR operation of the first bytes across some of the bytes of the first key, and not using any of the second bytes to form the reduced key. In non-limiting embodiments, the content may be first content, and the method may include receiving a second key having a second key size different from a size of the first key, reducing the second key size of the second key to a size less than the second key size to form a decryption key whose value is a function of some but not all bytes of the second key, and decrypting received second content according to the decryption key. The first and second keys may be received from a common source of the first and second content.

In another aspect, an assembly includes at least one computer storage that is not a transitory signal and that in turn includes instructions executable by at least one processor to transmit a first pre-key having a first size. The instructions are executable to transmit information indicating first bits of the first pre-key that a receiver is to use to render a first key for decrypting content. The first key has a second size smaller than the first size, and the first bits are some, but not all, bits of the first pre-key. Further, the instructions are executable to transmit a second pre-key having a third size different from the first size of the first pre-key, and to transmit information indicating first bits of the second pre-key that the receiver is to use to render a second key for decrypting content. The second key has a size smaller than the third size, and the first bits of the second pre-key are some but not all bits of the second pre-key.

In non-limiting examples of this aspect, the instructions can be executable to transmit information identifying the first size of the first pre-key to the receiver. In some embodiments the instructions may be executable to transmit information identifying an offset indicating a location in the first pre-key at which to combine the first bits. The assembly may include the processor. The assembly may include a secure enclave. The assembly may include a descrambler and secure memory. The assembly may include the receiver. The computer storage may be embodied in a computer network server.

In another aspect, a method includes receiving a first key having a variable size, and reducing the variable size of the first key to a second size less than the variable size to form a reduced key whose value is a function of all bytes of the first key. The method also includes decrypting received content according to the reduced key.

In another aspect, a method includes receiving a first key having a variable size that is less than the key size used for content decryption. The first key can be used as is, or it can be expanded. A method is disclosed that duplicates bytes from the first key to create the expanded key. The method also includes decrypting received content according to the expanded key.

The details of the present application, both as to its structure and operation, can best be understood in reference to the accompanying drawings, in which like reference numerals refer to like parts, and in which:

DETAILED DESCRIPTION

This disclosure relates generally to computer ecosystems including aspects of computer networks that may include consumer electronics (CE) devices. A system herein may include server and client components, connected over a network such that data may be exchanged between the client and server components. The client components may include one or more computing devices including portable televisions (e.g. smart TVs, Internet-enabled TVs), portable computers such as laptops and tablet computers, and other mobile devices including smart phones and additional examples discussed below. These client devices may operate with a variety of operating environments. For example, some of the client computers may employ, as examples, operating systems from Microsoft, or a Unix operating system, or operating systems produced by Apple Computer or Google. These operating environments may be used to execute one or more browsing programs, such as a browser made by Microsoft or Google or Mozilla or other browser program that can access websites hosted by the Internet servers discussed below.

Servers and/or gateways may include one or more processors executing instructions that configure the servers to receive and transmit data over a network such as the Internet. Or, a client and server can be connected over a local intranet or a virtual private network. A server or controller may be instantiated by a game console such as a Sony PlayStation®, a personal computer, etc.

Information may be exchanged over a network between the clients and servers. To this end and for security, servers and/or clients can include firewalls, load balancers, temporary storages, and proxies, and other network infrastructure for reliability and security.

As used herein, instructions refer to computer-implemented steps for processing information in the system. Instructions can be implemented in software, firmware or hardware and include any type of programmed step undertaken by components of the system.

A processor may be any conventional general-purpose single- or multi-chip processor that can execute logic by means of various lines such as address lines, data lines, and control lines and registers and shift registers.

Software modules described by way of the flow charts and user interfaces herein can include various sub-routines, procedures, etc. Without limiting the disclosure, logic stated to be executed by a particular module can be redistributed to other software modules and/or combined together in a single module and/or made available in a shareable library.

Present principles described herein can be implemented as hardware, software, firmware, or combinations thereof, hence, illustrative components, blocks, modules, circuits, and steps are set forth in terms of their functionality.

Further to what has been alluded to above, logical blocks, modules, and circuits described below can be implemented or performed with a general-purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

The functions and methods described below, when implemented in software, can be written in an appropriate language such as but not limited to C# or C++, and can be stored on or transmitted through a computer-readable storage medium such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hardwired cables including fiber optics and coaxial wires and digital subscriber line (DSL) and twisted pair wires.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B. or C" and "a system having at least one of A, B, C") includes systems that have A alone, B alone, C alone, A and B together, A and C together, B and C together, and/or A, B, and C together, etc.

Now specifically referring to FIG. 1, an example ecosystem 10 is shown, which may include one or more of the example devices mentioned above and described further below in accordance with present principles. The first of the example devices included in the system 10 is a consumer electronics (CE) device configured as an example primary display device, and in the embodiment shown is an audio video display device (AVDD) 12 such as but not limited to an Internet-enabled TV with a TV tuner (equivalently, set top box controlling a TV). The AVDD 12 may be an Android®-based system and the tuner may be an ATSC 3.0 tuner. The AVDD 12 alternatively may also be a computerized Internet enabled ("smart") telephone, a tablet computer, a notebook computer, a wearable computerized device such as e.g. computerized Internet-enabled watch, a computerized Internet-enabled bracelet, other computerized Internet-enabled devices, a computerized Internet-enabled music player, computerized Internet-enabled head phones, a computerized Internet-enabled implantable device such as an implantable skin device, etc. Regardless, it is to be understood that the AVDD 12 and/or other computers described herein is configured to undertake present principles (e.g. communicate with other CE devices to undertake present principles, execute the logic described herein, and perform any other functions and/or operations described herein).

Figure 1:
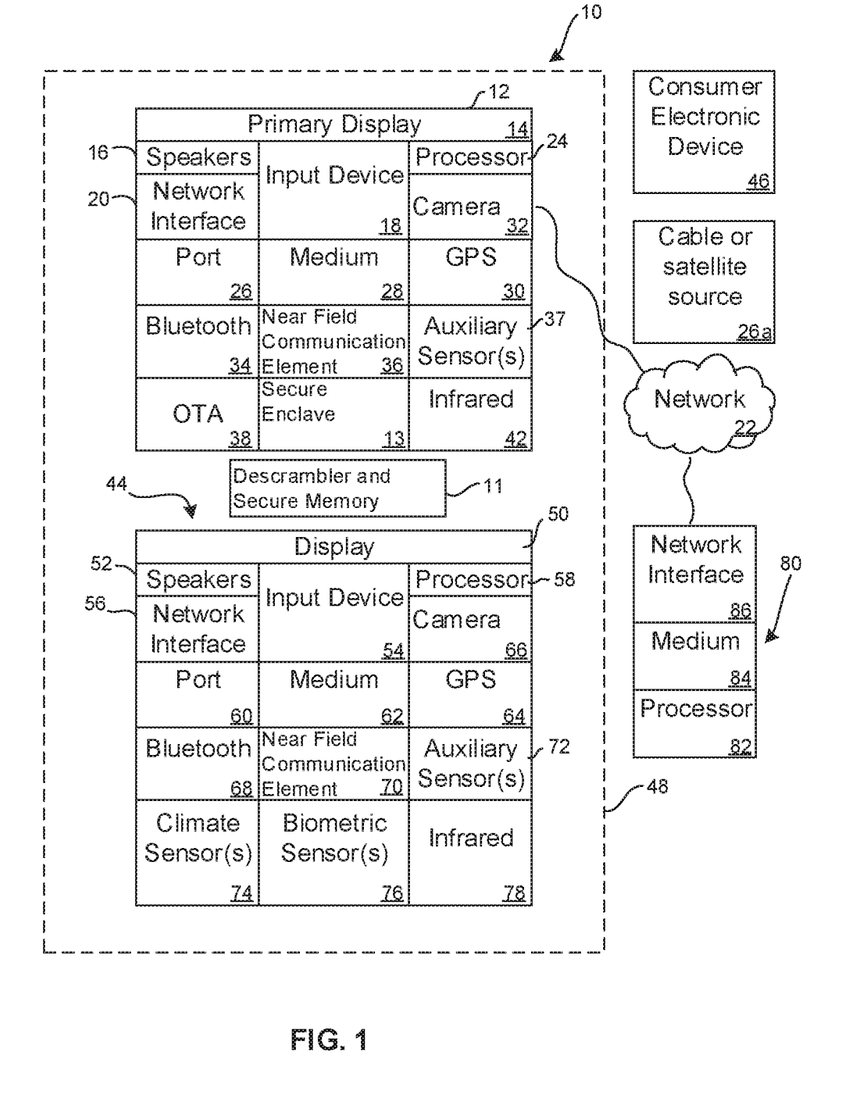
FIG. 1 is a block diagram of an example system including an example consistent with present principles.

Accordingly, to undertake such principles the AVDD 12 can be established by some or all of the components shown in FIG. 1. For example, the AVDD 12 can include one or more displays 14 that may be implemented by a high definition or ultra-high definition "4K" or higher flat screen and that may or may not be touch-enabled for receiving user input signals via touches on the display. Present principles are particularly useful for the circumstance in which the display 14 is not touch-enabled. The AVDD 12 may include one or more speakers 16 for outputting audio in accordance with present principles, and at least one additional input device 18 such as e.g. an audio receiver/microphone for e.g. entering audible commands to the AVDD 12 to control the AVDD 12. The example AVDD 12 may also include one or more network interfaces 20 for communication over at least one network 22 such as the Internet, a WAN, a LAN, a PAN etc. under control of one or more processors 24. Thus, the interface 20 may be, without limitation, a Wi-Fi transceiver, which is an example of a wireless computer network interface, such as but not limited to a mesh network transceiver. The interface 20 may be, without limitation a Bluetooth transceiver, Zigbee transceiver, IrDA transceiver, Wireless USB transceiver, wired USB, wired LAN, Powerline or MoCA. It is to be understood that the processor 24 controls the AVDD 12 to undertake present principles, including the other elements of the AVDD 12 described herein such as e.g. controlling the display 14 to present images thereon and receiving input therefrom. Furthermore, note the network interface 20 may be, e.g., a wired or wireless modem or router, or other appropriate interface such as, e.g., a wireless telephony transceiver, or Wi-Fi transceiver as mentioned above, etc.

In addition to the foregoing, the AVDD 12 may also include one or more input ports 26 such as, e.g., a high definition multimedia interface (HDMI) port or a USB port to physically connect (e.g. using a wired connection) to another CE device and/or a headphone port to connect headphones to the AVDD 12 for presentation of audio from the AVDD 12 to a user through the headphones. For example, the input port 26 may be connected via wire or wirelessly to a cable or satellite source 26a of audio video content. Thus, the source 26a may be, e.g., a separate or integrated set top box, or a satellite receiver. Or, the source 26a may be a game console or disk player containing content that might be regarded by a user as a favorite for channel assignation purposes described further below.

The AVDD 12 may further include one or more computer memories 28 such as disk-based or solid-state storage that are not transitory signals, in some cases embodied in the chassis of the AVDD as standalone devices or as a personal video recording device (PVR) or video disk player either internal or external to the chassis of the AVDD for playing back AV programs or as removable memory media. The processor 24 can be used to execute commercial audio-visual player applications with Digital Rights Management (DRM). In so doing, the processor 24 must process cryptographic algorithms in order to process authorization and access control messages and ultimately derive keys to decrypt the commercial AV programs. In some embodiments, some of the cryptographic processing is performed by a secure enclave 13. The secure enclave 13 typically contains a separate processor devoted to cryptographic security functions but may also consist of hardware-based key ladders which are controlled by registers which manipulate the transfer of keys and data through various stages as described in U.S. Pat. No. 7,366,302. The processor 24 or the secure enclave 13 may execute content descrambling instructions or the content descrambling may be off-load to a hardware descrambler which is also typically associated with a separate encrypted memory 11. The clear AV content is typically decoded from the descrambler and secure memory 11 and rendered on the primary display 14. In most embodiments, the secure enclave 13 can directly write the decryption keys into the hardware descrambler registers without the chance of being eavesdropped.

Also, in some embodiments, the AVDD 12 can include a position or location receiver such as but not limited to a cellphone receiver, GPS receiver and/or altimeter 30 that is configured to e.g. receive geographic position information from at least one satellite or cellphone tower and provide the information to the processor 24 and/or determine an altitude at which the AVDD 12 is disposed in conjunction with the processor 24. However, it is to be understood that that another suitable position receiver other than a cellphone receiver, GPS receiver and/or altimeter may be used in accordance with present principles to e.g. determine the location of the AVDD 12 in e.g. all three dimensions.

Continuing the description of the AVDD 12, in some embodiments the AVDD 12 may include one or more cameras 32 that may be, e.g., a thermal imaging camera, a digital camera such as a webcam, and/or a camera integrated into the AVDD 12 and controllable by the processor 24 to gather pictures/images and/or video in accordance with present principles. Also included on the AVDD 12 may be a Bluetooth transceiver 34 and other Near Field Communication (NFC) element 36 for communication with other devices using Bluetooth and/or NFC technology, respectively. An example NFC element can be a radio frequency identification (RFID) element.

Further still, the AVDD 12 may include one or more auxiliary sensors 37 (e.g., a motion sensor such as an accelerometer, gyroscope, cyclometer, or a magnetic sensor, an infrared (IR) sensor for receiving IR commands from a remote control, an optical sensor, a speed and/or cadence sensor, a gesture sensor (e.g. for sensing gesture command), etc.) providing input to the processor 24. The AVDD 12 may include an over-the-air (OTA) TV broadcast port 38 for receiving OTA TV broadcasts providing input to the processor 24. In addition to the foregoing, it is noted that the AVDD 12 may also include an infrared (IR) transmitter and/or IR receiver and/or IR transceiver 42 such as an IR data association (IRDA) device. A battery (not shown) may be provided for powering the AVDD 12.

Still referring to FIG. 1, in addition to the AVDD 12, the system 10 may include one or more other computer device types that may include some or all of the components shown for the AVDD 12. In one example, a first device 44 and a second device 46 are shown and may include similar components as some or all of the components of the AVDD 12. Fewer or greater devices may be used than shown.

In the example shown, to illustrate present principles all three devices 12, 44, 46 are assumed to be members of a local network in, e.g., a dwelling 48, illustrated by dashed lines.

The example non-limiting first device 44 may include one or more touch-sensitive surfaces 50 such as a touch-enabled video display for receiving user input signals via touches on the display. The first device 44 may include one or more speakers 52 for outputting audio in accordance with present principles, and at least one additional input device 54 such as e.g. an audio receiver/microphone for e.g. entering audible commands to the first device 44 to control the device 44. The example first device 44 may also include one or more network interfaces 56 for communication over the network 22 under control of one or more processors 58. Thus, the interface 56 may be, without limitation, a Wi-Fi transceiver, which is an example of a wireless computer network interface, including mesh network interfaces. It is to be understood that the processor 58 controls the first device 44 to undertake present principles, including the other elements of the first device 44 described herein such as e.g. controlling the display 50 to present images thereon and receiving input therefrom. Furthermore, note the network interface 56 may be, e.g., a wired or wireless modem or router, or other appropriate interface such as, e.g., a wireless telephony transceiver, or Wi-Fi transceiver as mentioned above, etc.

In addition to the foregoing, the first device 44 may also include one or more input ports 60 such as, e.g., a HDMI port or a USB port to physically connect (e.g. using a wired connection) to another computer device and/or a headphone port to connect headphones to the first device 44 for presentation of audio from the first device 44 to a user through the headphones. The first device 44 may further include one or more tangible computer readable storage medium 62 such as disk-based or solid-state storage. Also in some embodiments, the first device 44 can include a position or location receiver such as but not limited to a cellphone and/or GPS receiver and/or altimeter 64 that is configured to e.g. receive geographic position information from at least one satellite and/or cell tower, using triangulation, and provide the information to the device processor 58 and/or determine an altitude at which the first device 44 is disposed in conjunction with the device processor 58. However, it is to be understood that that another suitable position receiver other than a cellphone and/or GPS receiver and/or altimeter may be used in accordance with present principles to e.g. determine the location of the first device 44 in e.g. all three dimensions.

Continuing the description of the first device 44, in some embodiments the first device 44 may include one or more cameras 66 that may be, e.g., a thermal imaging camera, a digital camera such as a webcam, etc. Also included on the first device 44 may be a Bluetooth transceiver 68 and other Near Field Communication (NFC) element 70 for communication with other devices using Bluetooth and/or NFC technology, respectively. An example NFC element can be a radio frequency identification (RFID) element.

Further still, the first device 44 may include one or more auxiliary sensors 72 (e.g., a motion sensor such as an accelerometer, gyroscope, cyclometer, or a magnetic sensor, an infrared (IR) sensor, an optical sensor, a speed and/or cadence sensor, a gesture sensor (e.g. for sensing gesture command), etc.) providing input to the CE device processor 58. The first device 44 may include still other sensors such as e.g. one or more climate sensors 74 (e.g. barometers, humidity sensors, wind sensors, light sensors, temperature sensors, etc.) and/or one or more biometric sensors 76 providing input to the device processor 58. In addition to the foregoing, it is noted that in some embodiments the first device 44 may also include an infrared (IR) transmitter and/or IR receiver and/or IR transceiver 42 such as an IR data association (IRDA) device. A battery may be provided for powering the first device 44. The device 44 may communicate with the AVDD 12 through any of the above-described communication modes and related components.

The second device 46 may include some or all of the components described above.

Now in reference to the afore-mentioned at least one server 80, it includes at least one server processor 82, at least one computer memory 84 such as disk-based or solid state storage, and at least one network interface 86 that, under control of the server processor 82, allows for communication with the other devices of FIG. 1 over the network 22, and indeed may facilitate communication between servers, controllers, and client devices in accordance with present principles. Note that the network interface 86 may be, e.g., a wired or wireless modem or router, Wi-Fi transceiver, or other appropriate interface such as, e.g., a wireless telephony transceiver.

Accordingly, in some embodiments the server 80 may be an Internet server and may include and perform "cloud" functions such that the devices of the system 10 may access a "cloud" environment via the server 80 in example embodiments. Or, the server 80 may be implemented by a game console or other computer in the same room as the other devices shown in FIG. 1 or nearby.

The devices described below may incorporate some or all of the elements described above.

The above methods may be implemented as software instructions executed by a processor, suitably configured application specific integrated circuits (ASIC) or field programmable gate array (FPGA) modules, or any other convenient manner as would be appreciated by those skilled in those art. Where employed, the software instructions may be embodied in a non-transitory device such as a CD ROM or Flash drive. The software code instructions may alternatively be embodied in a transitory arrangement such as a radio or optical signal, or via a download over the internet.

Figure 2:
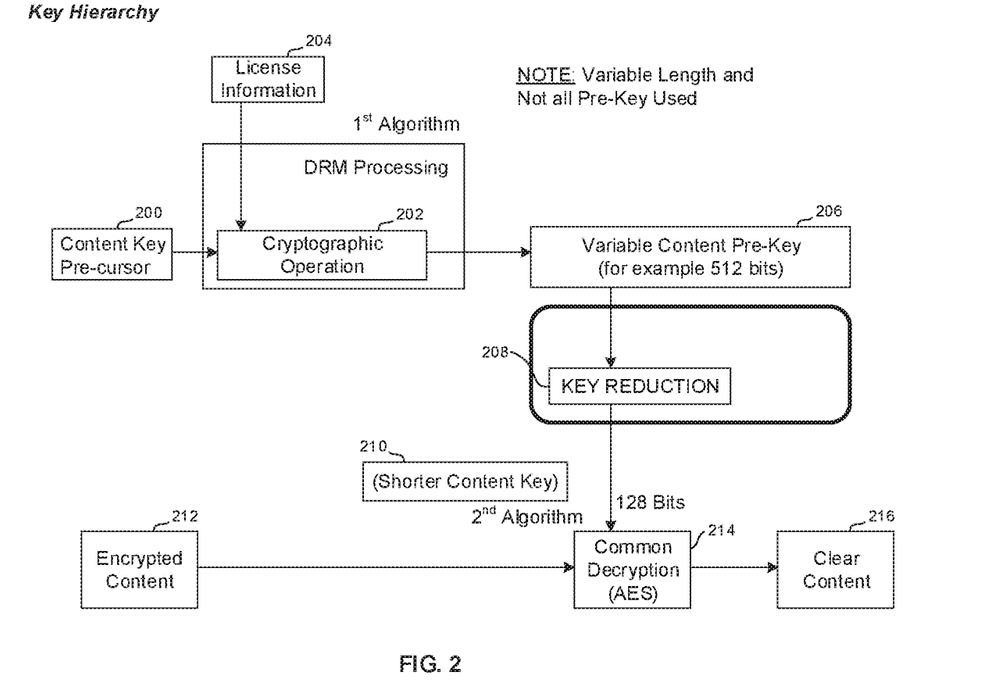
FIG. 2 is a block diagram showing key and content flow.

Turning to FIG. 2, the processor 24 and/or the secure enclave 13 may perform the cryptographic key hierarchy operation. FIG. 2 schematically shows an example implementation in which a content key precursor 200 is processed in a processing block 202 using license information 204, such as may be embodied in a digital rights management (DRM) license. A license is an entitlement for a service digitally encoded by the DRM provider, e.g. Microsoft PlayReady or Google Widevine. The processing block 202 may be a public key decryption operation which can yield a large number of content pre-key bits 206. Alternatively, the processing block 202 may be a hashing operation, e.g. using SHA-2 or SHA-3 which similarly can yield a large number of content pre-key bits 206. The output of the processing block 202 is a pre-key 206 with a variable length, i.e., pre-keys do not all have the same number of bits consistent with present principles. In an example, a first pre-key may have a size of 512 bits while a second pre-key may have a size larger or smaller than 512 bits.

The pre-key 206 is reduced in size by a key reduction block 208. In an example and as discussed further below, this reduction may include logically combining a subset of bits in the pre-key 206 (a subset being one or more, but not all, of the bits of the pre-key) with other bits of the pre-key. An example logical operation is an XOR operation. The reduction may further include discarding one or more bits of the pre-key 206 entirely such that none of the discarded bits are used in generating a content key 210, which is the output of the reduction block 208. In any case, the content key 210 is shorter than the pre-key 206. Thus, for example, if the pre-key 206 is 184 bits in size, the content key 210 generated from the pre-key 206 is shorter, e.g., 128 bits.

The content key 210 is then used to decrypt content 212 such as audio-video content in a content decryption block 214. This may be done is some examples using Advanced Encryption Standard (AES) principles, although other encryption/decryption schemes may be used. The output of the content decryption block 214 is clear content 216 that can be decoded and rendered on the primary display 14 and speakers 16 as shown in FIG. 1.

Note that the elements of FIG. 2 may be implemented in a TV and/or a set-top box that incorporate any of the appropriate elements shown and described in reference to FIG. 1. The content being decrypted (and, hence, keys used to decrypt the content, where appropriate) may conform to the ATSC 3.0 standard.

Note further that a first pre-key of a first length may be provided to a receiver for decryption of first content, and subsequently a second pre-key of a second length may be provided to the same receiver to decrypt second content. The receiver may be provided additional information as divulged further below to identify what pre-key bits to discard, which bits to logically combine with other bits, and where the logical combination should take place within the pre-key. Note that "bits" includes groups of bits such as bytes.

Figure 3:
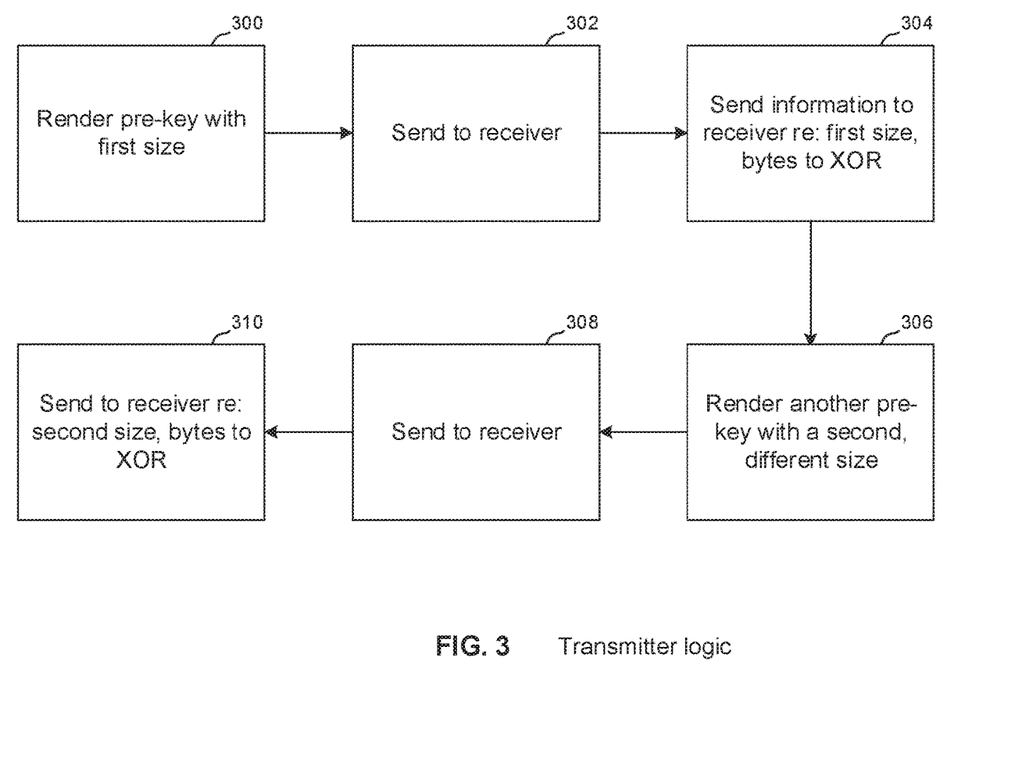
FIG. 3 is a flow chart of example transmitter logic consistent with present principles.

Prior to describing examples of the above description, attention is turned to FIG. 3, showing the logic that may be implemented by an example transmitter such as a computer network server that sends content and in some cases also the pre-keys and other decryption information to a receiver. Commencing at block 300, a pre-key is generated or rendered with a first size using key generation techniques. The pre-key is sent to one or more receivers at block 302. Along with the pre-key (i.e., in the same channel, or if desired in a different channel) information is sent at block 304 to the receiver(s) identifying some or all of the size of the pre-key, the bits of the pre-key and/or number of bits of the pre-key that are to be logically combined with other bits of the pre-key (essentially, a first offset), and if desired a second offset in the pre-key identifying the location in the pre-key at which the bits that are to be logically combined with other bits of the pre-key.

Blocks 306-310 indicate that the operations in blocks 300-304 may be subsequently repeated to provide a second pre-key, but because the pre-keys have variable sizes, the second pre-key has a size different from that of the first pre-key. Thus, at block 306 a second pre-key is generated or rendered with a second size using key generation techniques. The second pre-key is sent to one or more receivers at block 308. Along with the second pre-key (i.e., in the same channel, or if desired in a different channel) information is sent at block 310 to the receiver(s) identifying some or all of the size of the second pre-key, the bits of the second pre-key that are to be logically combined with other bits of the second pre-key, and if desired an offset in the second pre-key identifying the location in the second pre-key at which the bits that are to be logically combined with other bits of the second pre-key.

Figure 4:
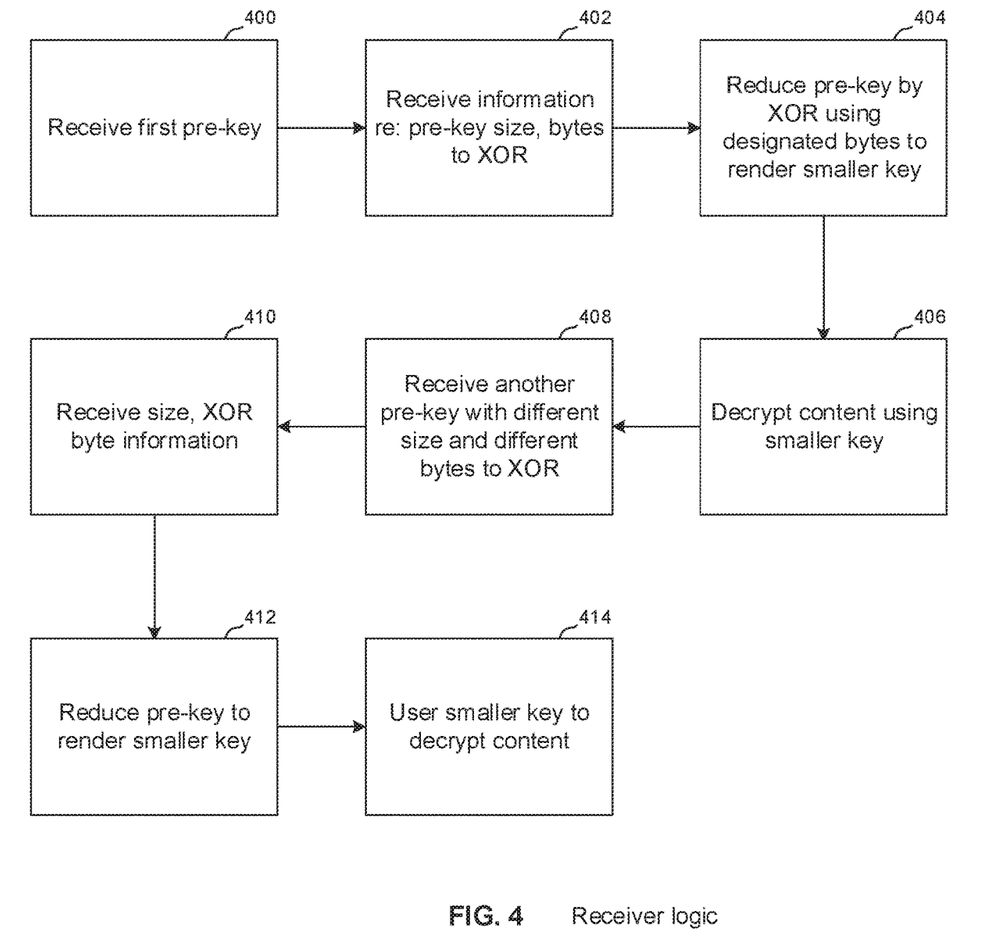
FIG. 4 is a flow chart of example receiver logic consistent with present principles.

FIG. 4 illustrates receiver-side logic. Commencing at block 400, the first pre-key from FIG. 3 is received, and at block 402 the information from block 304 is also received. Moving to block 404, using the information received at block 402 and the pre-key received at block 400, the size of the first pre-key is reduced, e.g., using an XOR operation, to render a smaller content key. Content is then decrypted at block 406 using the content key.

Blocks 408-414 indicate that the second pre-key from blocks 306-310 in FIG. 3 may be used to decrypt second content. Thus, at block 408, the second pre-key from FIG. 3 (having a different length than the first pre-key) is received, and at block 410 the information from block 310 is also received. Moving to block 412, using the information received at block 410 and the second pre-key received at block 408, the size of the second pre-key is reduced, e.g., using an XOR operation, to render a smaller content key. Content is then decrypted at block 414 using the second content key.

Figure 5:
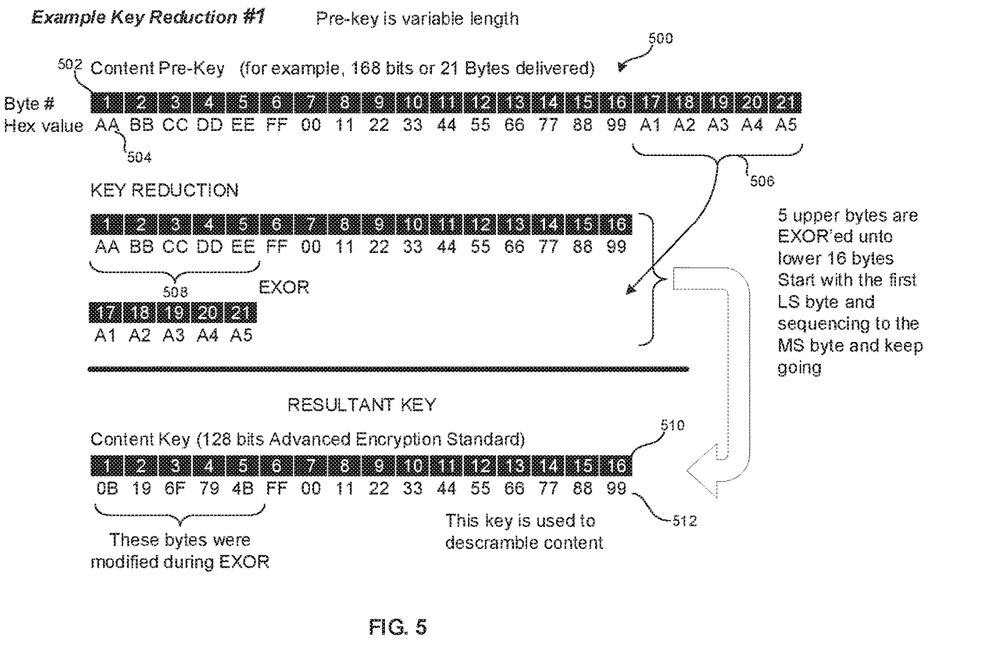
FIGS. 5-10 are schematic diagrams showing illustrative pre-key reductions to the decryption key.

FIGS. 5-8 provide examples of the above disclosure. In FIG. 5, a pre-key 500 of, for example, 168 bits or 21 bytes is shown, illustrated schematically as having twenty one (21) bytes 502 each with a respective byte value 504 such as a hexadecimal value. In the example shown, the five upper bytes 506 of the pre-key 500 are to be logically combined (e.g., on a byte-by-byte basis using XOR) with the first five bytes 508 to render a content key 510 in which the first five bytes 512 are logical combinations of the five of the bytes 506 with respective ones of the bytes 508. In this example, the information sent from the transmitter to the receiver, along with the pre-key 500, can include the identifications of the bytes 506, 508 in a suitable manner, such as by listing them on a byte-by-byte basis. Or, indication may be done by indicating a first offset beginning at the start of the five upper bytes 506 (which in this case would indicate the location of byte 17) along with the number "5" indicating number of byte combinations to be implemented, and a second offset indicating the location of the lower bytes 508 at which logical combination is to be commenced (which in this case would indicate the location of byte 12).

Figure 6:
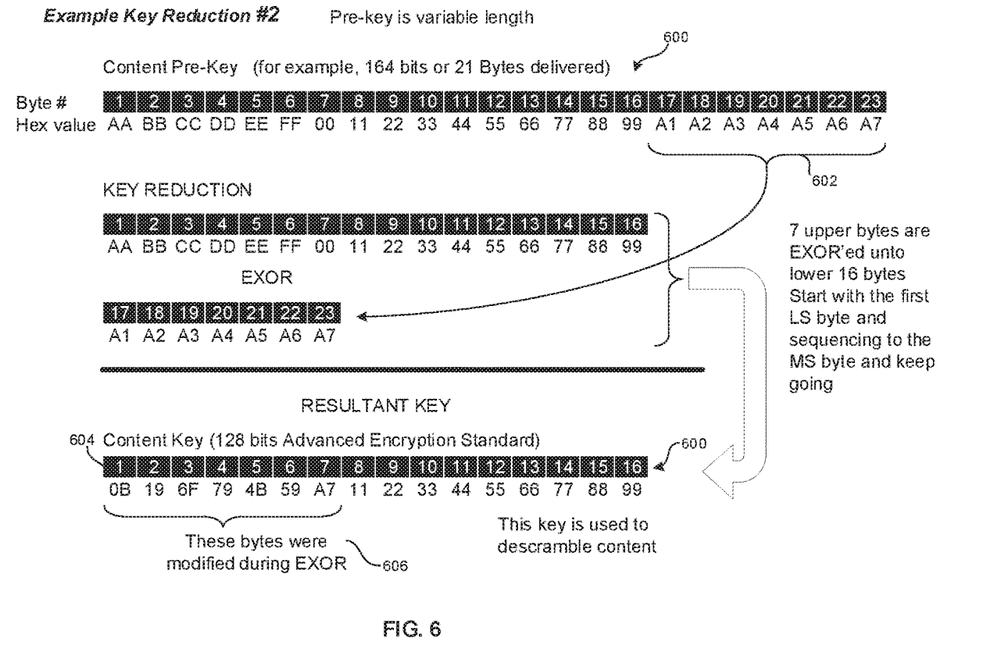

FIG. 6 illustrates a situation similar to that of FIG. 5, except that a pre-key 600 has twenty three (23) bytes, not twenty one (21), and the upper seven bytes 602 are to be logically combined with seven of the lower bytes of the pre-key to render a content key 604 that is only 16 bytes in length, the first seven bytes 606 of which are combinations of upper and lower bytes of the pre-key 600.

Figure 7:
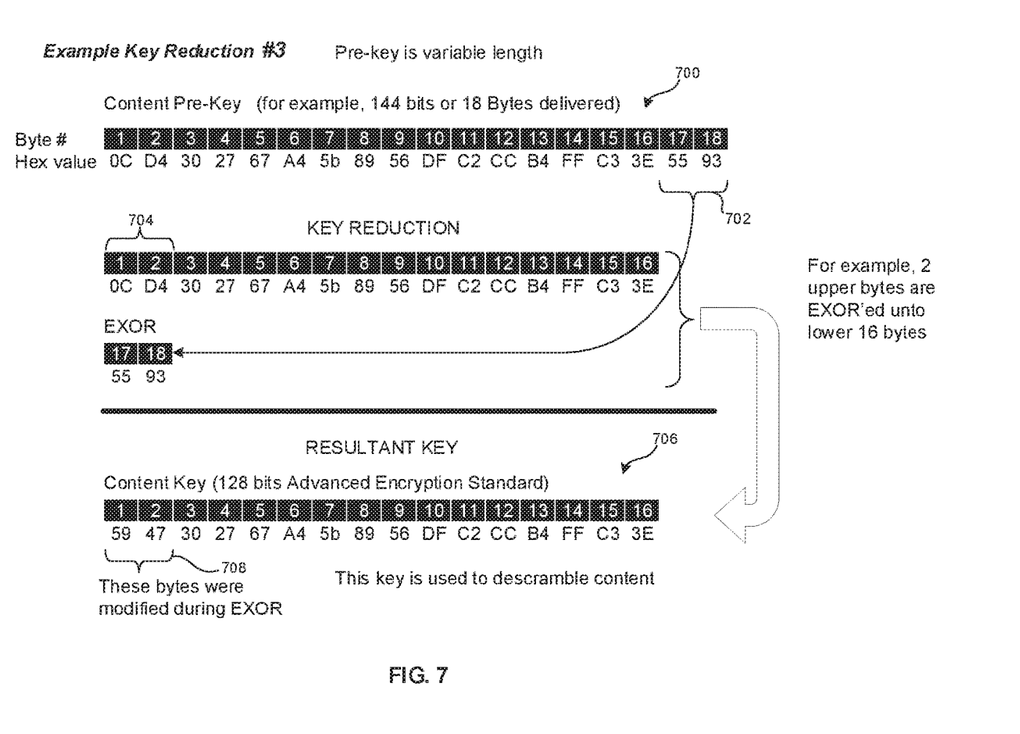

While FIG. 7 illustrates a pre-key 600 that is longer than the pre-key 500 in FIG. 5. FIG. 7 illustrates a pre-key 700 that is shorter than the pre-key 500 in FIG. 5, in this case, that is eighteen (18) bytes in size. In the example shown, only the last two bytes 702 of the pre-key 700 are logically combined with the immediately preceding two bytes 704 to render a content key 706 that is only 16 bytes in length, the upper two bytes 708 of which are combinations of upper and lower bytes of the pre-key 700.

Note that in all four of the cases shown in FIGS. 5-9, the content keys are all shorter than their respective pre-keys but are equal to each other in length, in the example shown, sixteen (16) bytes in length. In the case of FIG. 10, the content key is larger than the respective pre-key and is also equal in length to the content key of the other cases, sixteen (16) bytes in length.

Figure 8:
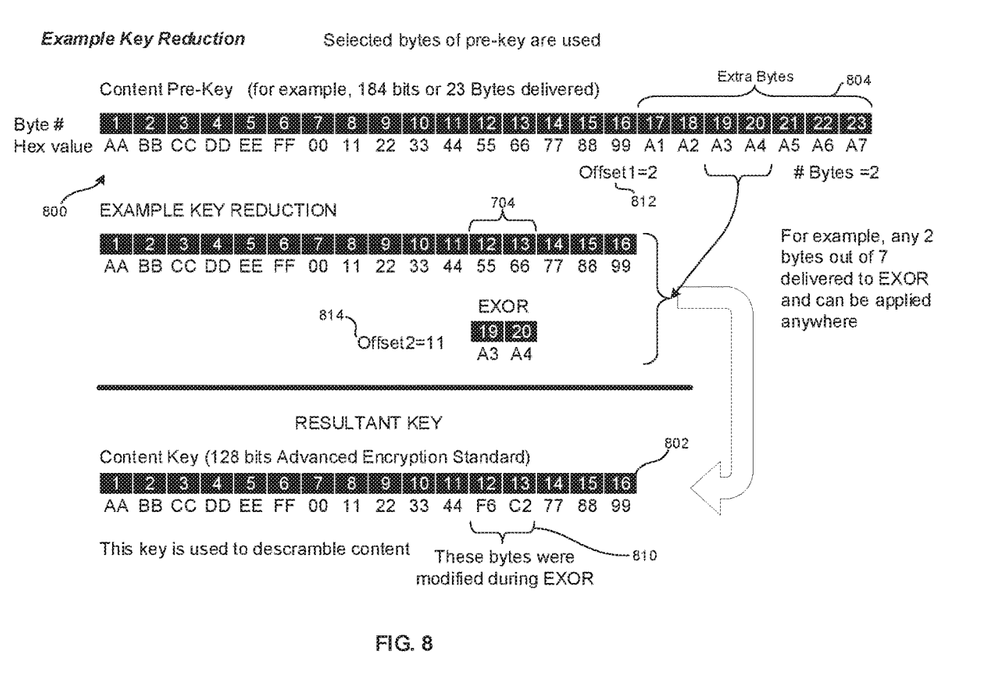

FIG. 8 illustrates another example approach in which a pre-key 800 has a size of twenty three (23) bytes, as was the case with the pre-key 600 of FIG. 6, but not all of the bytes in the pre-key 80X) are used to generate a resultant 16-byte content key 802. Instead, of the seven upper bytes 804 of the pre-key 800, five of the bytes 804 are discarded and only two designated bytes 806 are logically combined with two designated lower bytes 808. Moreover, the two designated upper bytes 806 are not combined with the two lower bytes immediately preceding the upper bytes 804, but rather with two lower bytes 808 separated from the upper bytes 804 by one or more intervening bytes as shown. In the example shown, the designated lower bytes 808 that are to be logically combined with the designated upper bytes 806 are separated from the upper bytes 804 by three intervening bytes, shown as byte numbers 14-16 in FIG. 8. The resulting content key 802 has internal bytes 810 (numbered "12" and "13") that are logical combinations of respective upper and lower bytes from the pre-key 800, with the upper-most byte or bytes of the content key 802 remaining unchanged from the corresponding bytes of the pre-key 800.

In this case, the information provided to the receiver may indicate a first offset 812 indicating the location of the first of the two designated upper bytes 806 along with the number "2" indicating the number of bytes to be combined, and a second offset 814 indicating the location in the lower bytes at which logical combining is to commence. The information may also include an indication that only a subset (in this case, two) of the upper bytes are to be used and that the remaining bytes in the upper bytes 804 are to be discarded. It should be noted that if the pre-key 800 were greater than 23 bytes and if the number to be included were greater than 5 in this example, than the bytes would wrap around. The sixth byte would be combined with the first byte of the pre-key 800. This case is not shown in a figure.

Figure 9:
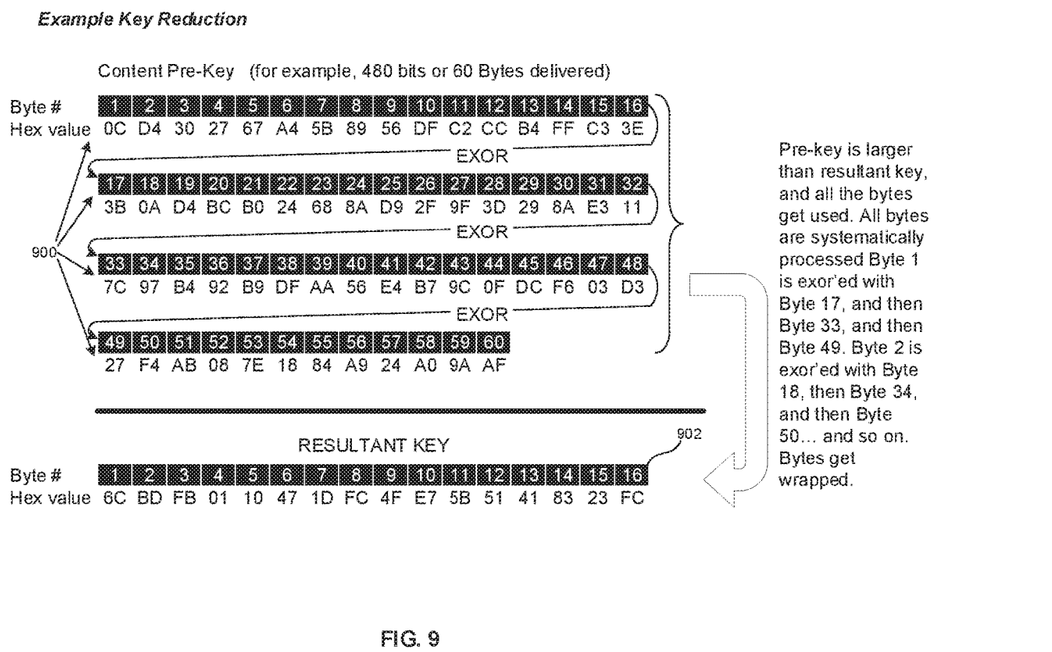
Figure 10:
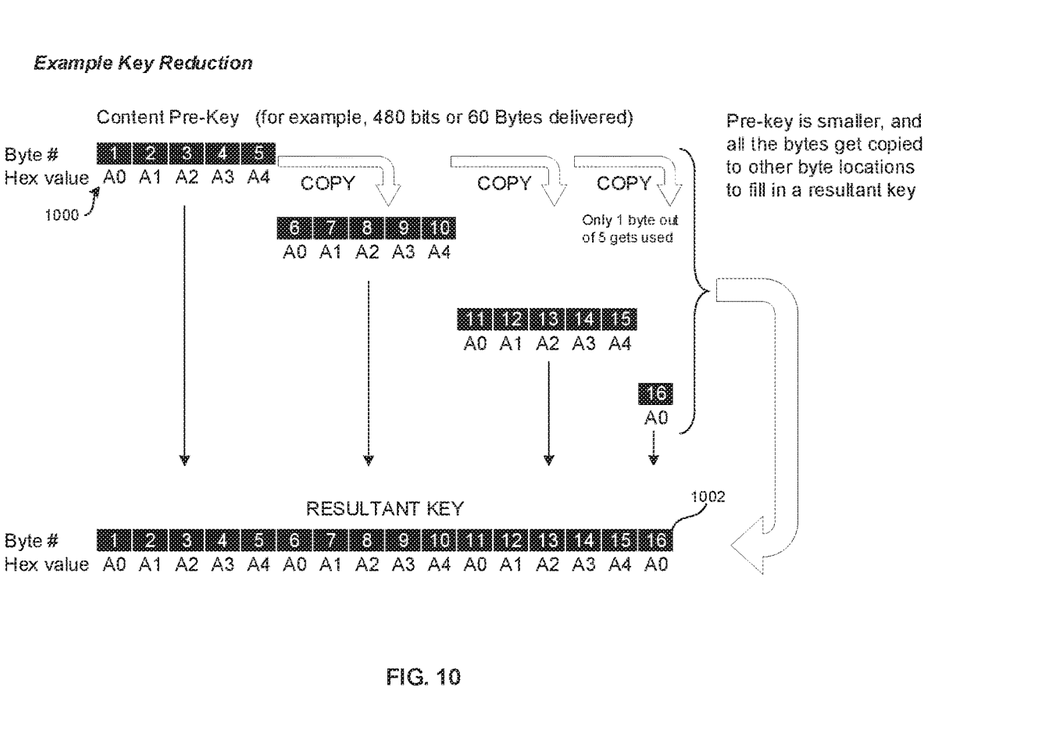

FIG. 9 illustrates another example approach in which a pre-key 900 has a size of sixty bytes, where all the bytes are used in the creation of the content key 902. The extra bytes are multiple times the length of the resultant key. The extra bytes get wrapped. And so bytes 1 to 16 get EXOR'ed to bytes 17 to 32 which in turn get EXOR'ed to bytes 33 to 48 and lastly gets EXOR'ed with bytes 49 to 60. Consequently, one can see that byte 1 of the resultant key 902 is a function of bytes 1, 17, 33 and 49 of the pre-key 900. Byte 2 of the resultant key 902 is a function of bytes 2, 18, 34, and 50 of the pre-key 900. And so on for all the other bytes 3 to 12. Byte 13 of the resultant key 902 is function of only bytes 13, 29 and 45 of the pre-key 900 since there were only 60 bytes of pre-key 902 in this example. And it is likewise for bytes 14 to 16 of the resultant key 902.

FIG. 10 illustrate the case when there are fewer pre-key bits 1000 than the resultant key 1002. In this example, there are only 5 bytes of pre-key 1000. These bytes get replicated twice and then only one byte of the pre-key is used to create the last byte of the resultant key 1002. It should be noted that the content pre-key could be used AS-IS as the resultant key, with some of the resultant key bits set to zero or other set value. This scenario of using the content pre-key AS IS is not shown in a figure.

Figure 11:
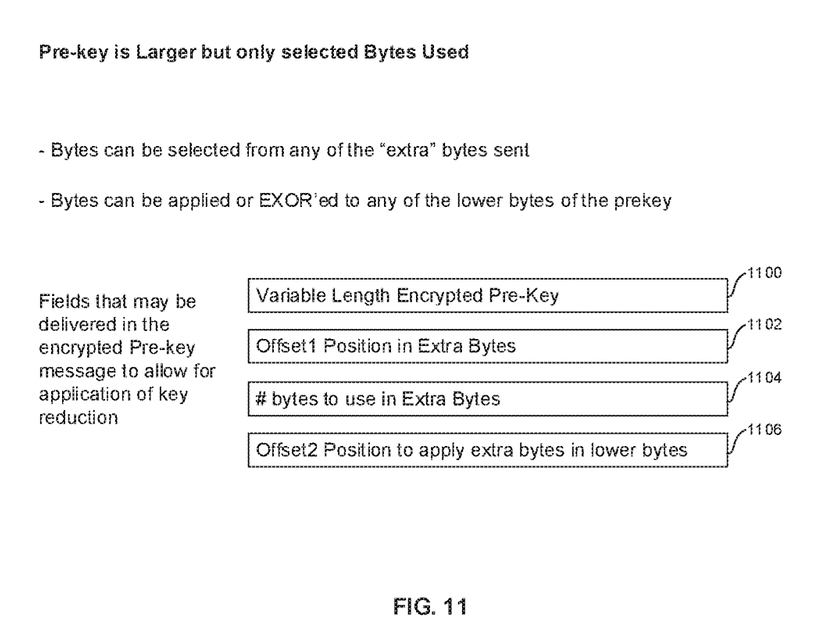
FIG. 11 is a schematic diagram of an example pre-key data structure consistent with present principles.

FIG. 11 illustrates further an example information data structure that may be sent to the receiver at block 304 in FIG. 3 and received at block 402 in FIG. 4, for use along the lines illustrated by the examples of FIGS. 5-8 and in particular the example of FIG. 8. The information data structure may be part of the content key pre-cursor data 200 of FIG. 2. A field 1100 indicates the length of the pre-key 800, and the offset 812 is included in a field 1102. The number of bytes in the upper bytes 804 to combine with a like number of bytes in the lower bytes is indicated in a field 1104. The second offset 814 is indicated in a field 1106. The designated upper bytes 806 in the upper bytes 804 may be any one or more of the upper bytes 804 while the designated lower bytes 808 with which the designate upper bytes 806 are to be combined may be any of the lower bytes below the upper bytes 804.

It will be appreciated that whilst present principals have been described with reference to some example embodiments, these are not intended to be limiting, and that various alternative arrangements may be used to implement the subject matter claimed herein.

What is claimed is:

1. An apparatus, comprising:
    at least one processor embodied in at least one computer and configured with instructions to:
    receive a first pre-key, the first pre-key having a first size;
    reduce the first size by at least a first logical operation using first bits of the first pre-key with second bits of the first pre-key to render a first key for decrypting at least one content, the first key having a second size smaller than the first size;
    decrypt the content using the first key;
    receive a second pre-key having a third size different from the first size;

reduce the third size by a logical operation using first bits of the second pre-key with second bits of the second pre-key to render a second key for decrypting the content, the second key having a size smaller than the third size; and decrypt the content using the second key;

wherein the first pre-key comprises first bytes and second bytes, and reducing the first size comprises:

performing a logical exclusive OR operation of the first bytes across some of the bytes of the first pre-key, and not using any of the second bytes to form the first key.

2. The apparatus of claim 1, wherein at least the first logical operation comprises an exclusive-OR operation.

3. The apparatus of claim 1, wherein the instructions are executable to:

receive information identifying the first bits; and use the information to execute the logical operation.

4. The apparatus of claim 1, wherein the instructions are executable to:

receive information identifying the first size; and use the information to execute the first logical operation.

5. The apparatus of claim 1, wherein some or all of the bits of the first and second pre-key are the result of public key or hash operations, and the first and second keys are used with a symmetric block cipher.

6. The apparatus of claim 1, wherein the processor is embodied in one of: a television, a set-top box, a tablet, a cell-phone.

7. The apparatus of claim 1, wherein at least one byte of the first pre-key is not used to generate any byte of the first key.

8. The apparatus of claim 1, wherein the instructions are executable to:

transmit information identifying the first size of the first pre-key to the receiver.

9. The apparatus of claim 1, wherein the instructions are executable to:

transmit information identifying an offset indicating a location in the first pre-key at which to combine the first bits.

10. The apparatus of claim 1, wherein the processor is embodied in a computer network server.

11. A method comprising:

receiving a first key having a variable size;

responsive to the variable size of the first key being greater than a second key size, reducing the variable size of the first key to a second size less than the variable size to form a reduced key whose value is a function of some but not all bytes of the first key and decrypting received content according to the reduced key;

wherein the first key comprises first bytes and second bytes, and reducing the variable size comprises:

performing a logical exclusive OR operation of the first bytes across some of the bytes of the first key, and not using any of the second bytes to form the reduced key.

12. The method of claim 11, wherein the first key is received from Digital Rights Management (DRM) processing.

13. The method of claim 11, wherein the first key is result of a public key or hashing cryptographic operation.

14. The method of claim 11, comprising:

responsive to the variable size of the first key being equal to a second key size, using the first key as is and decrypting the received content according to the first key.

15. The method of claim 11, comprising:

responsive to the variable size of the first key being smaller than a second key size, using all the bits of the first key and filling in the remaining bits up to the second key size with known values to create an expanded key, and decrypting the received content with the expanded key.

16. The method of claim 11, comprising:

responsive to the variable size of the first key being smaller than a second key size, using all the bits of the first key and replicating bits of the first key up to the second key size to create an expanded key, and decrypting the received content according to the expanded key.

17. An assembly comprising:

at least one processor embodied in at least one computer and programmed with instructions for:

receiving a first key having a first size;

performing at least one of:

responsive to the first size of the first key being smaller than a second key size, using all the bits of the first key and filling in the remaining bits up to the second key size with known values to create an expanded key, and decrypting at least one received content with the expanded key;

responsive to the first size of the first key being smaller than a second key size, using all the bits of the first key and replicating bits of the first key up to the second key size to create an expanded key, and decrypting the received content according to the expanded key.

18. An assembly comprising:

at least one processor embodied in at least one computer and programmed with instructions for:

receiving a first key having a first size;

responsive to the first size of the first key being smaller than a second key size, using all the bits of the first key and filling in the remaining bits up to the second key size with known values to create an expanded key, and decrypting at least one received content with the expanded key.

19. An assembly comprising:

at least one processor embodied in at least one computer and programmed with instructions for:

receiving a first key having a first size;

responsive to the first size of the first key being smaller than a second key size, using all the bits of the first key and replicating bits of the first key up to the second key size to create an expanded key, and decrypting at least one received content according to the expanded key.

* * * * *